United States Patent [19]
Akasaka et al.

[11] Patent Number: 5,094,144
[45] Date of Patent: Mar. 10, 1992

[54] BENT AXIS TYPE VARIABLE DISPLACEMENT HYDRAULIC MACHINE

[76] Inventors: Yoshimichi Akasaka, 12-16, Kandatsu Chuuoh 5-chome, Tsuchiura-shi, Ibaraki 300; Ichiro Nakamura, 2897-33, Mawatari, Katsuta-shi, Ibaraki 312; Yasuharu Gotoh, 978-108, Shiratori-cho, Tsuchiura-shi, Ibaraki 300, all of Japan

[21] Appl. No.: 552,521

[22] Filed: Jul. 16, 1990

[30] Foreign Application Priority Data

Jul. 15, 1989 [JP] Japan ................. 1-183287

[51] Int. Cl.⁵ .................. F01B 13/04; F16C 32/06
[52] U.S. Cl. .................. 91/486; 91/499; 91/504
[58] Field of Search ............. 91/499, 504, 505, 506, 91/486

[56] References Cited

U.S. PATENT DOCUMENTS

| | | | |
|---|---|---|---|
| 2,967,491 | 1/1961 | Wiggermann | 91/505 |
| 4,024,799 | 5/1977 | Forster | 91/499 |
| 4,464,979 | 8/1984 | Forster | 91/499 |
| 4,546,692 | 10/1985 | Lotter | 91/499 |
| 4,788,902 | 12/1988 | Akasaka | 91/499 |

Primary Examiner—Richard A. Bertsch
Assistant Examiner—Peter Korytnyk
Attorney, Agent, or Firm—Antonelli, Terry, Stout & Kraus

[57] ABSTRACT

A bent axis type variable displacement hydraulic machine employing hydrostatic radial bearings for supporting hydraulic reaction forces exerted on the cylinder block. In a hydraulic machine of this sort, the number of pistons which are located in the high pressure are varies with the rotation of the cylinder block, and the resultant force of hydraulic reaction forces has an acting point at a position off the axis of the rotational shaft. Therefore, the hydrostatic radial bearings are located in such positions as to balance the moment loads which occur about the rotational shaft in relation with the acting point of the resultant force of radial hydraulic reaction forces on the drive disc of the rotational shaft. As a result, it becomes possible to lead to suppression of oil leaks from the sliding surfaces to a minimal rate and to prevent abnormal abrasive wear of each of the sliding surfaces.

11 Claims, 6 Drawing Sheets

BENT AXIS TYPE VARIABLE DISPLACEMENT HYDRAULIC MACHINE

FIELD OF THE INVENTION

The present invention relates to a bent axis type variable displacement hydraulic machine for a hydraulic pump, hydraulic motor or the like, and, more particularly, to a bent axis type variable displacement hydraulic machine for supporting a rotational shaft by partial and/or total hydrostatic bearings.

BACKGROUND OF THE INVENTION

Generally, a bent axis type hydraulic pump is a drive disc on a rotational shaft, coupled with a cylinder block through pistons which are reciprocably received in the cylinder block. Therefore, when the bent axis type hydraulic machine is a hydraulic pump, the hydraulic reaction forces acting on the pistons on the high pressure side in a discharge stroke are supported by the rotational shaft through the drive disc. Similarly, when a hydraulic motor, the hydraulic reaction forces which act on the pistons on the high pressure side in the suction (feeding) stroke are supported by the rotational shaft through the drive disc.

Accordingly, in a bent axis type hydraulic machine of this type, the rotational shaft is subject to radial and thrust loads of the hydraulic reaction forces, and therefore it is necessary to mount the rotational shaft in a suitable condition for supporting these loads.

In this connection, it has been the general practice in the prior art to result to the so called mechanical type support which mechanically supports the rotational shaft rotatably by ball or roller bearings capable of supporting the radial and thrust loads, the partial hydrostatic support which mechanically supports either the radial or thrust loads by a roller or ball bearing while supporting the other load by a hydrostatic bearing, or the total hydrostatic type support which supports the entire loads hydraulically by means of hydrostatic bearings.

Of these various types of shaft support, a hydraulic machine employing a shaft support of the partial hydrostatic type bearing is described, for example, in Japanese Laid-Open Patent Application 60-224981, wherein a rotational shaft is supported by a hydrostatic thrust bearing composed of a stationary bearing and a movable bearing, with the movable bearing being provided with springs in an outer ring to counteract the thrust load which acts on the rotational shaft, along with pistons which are located on the side of the outer ring to generate a pressure in the same direction as the springs and to which oil pressure is applied from the high pressure area in the cylinder block.

On the other hand, a hydraulic machine supporting a shaft totally with hydrostatic bearings is described in Japanese Laid-Open Patent Application 59-131776, which is provided with a radial load bearing sleeve and a thrust load bearing plate within a casing, in combination with a drive flange which is provided movably between the bearing sleeve and the bearing plate to serve also as a drive disc. The drive flange has one end face thereof securely connected to a rotational shaft and the other end face coupled with pistons. Further, a plural number of pressure chambers constituting a hydrostatic radial bearing, are defined between the outer peripheral surface of the drive flange and the bearing sleeve, and a plurality of drive shoes, constituting a hydrostatic thrust bearing, are provided on one end face of the drive flange. The pistons and drive flanges have oil passages bored therein for supplying high pressure oil independently to the hydrostatic radial and thrust bearings from the corresponding cylinders, to thereby hydrostatically support the radial and thrust loads.

When the bent axis type variable displacement hydraulic machine is a hydraulic pump, the hydraulic reaction forces acting on the pistons in the high pressure area in the discharge stroke are supported by the rotational shaft through the drive disc. In such a case, the point of exertion or the acting point of the resultant force of such hydraulic reaction forces is located in an eccentric position with respect to the axis of the rotational shaft. Besides, the positions and the number of pistons in the high pressure area changes with the rotation of the cylinder block, so that the location of the acting point of the resultant force of hydraulic reaction forces also changes with the rotation of the cylinder block, generally drawing a locus of the shape of "$\infty$". Therefore, the center of the locus of the resultant force of hydraulic reaction forces is usually referred to as an acting point of mean hydraulic reaction force. When the bent axis type hydraulic machine is a hydraulic motor, the acting point of the resultant location off the axis of the rotational shaft.

As a result of the off-axis location of the acting point of the resultant force of hydraulic reaction force relative to the axis of the rotational shaft, the drive disc is subject not only to the radial and thrust load components but also to moment components which are induced by the radial and thrust load components.

However, in the prior art bent axis type hydraulic machine, especially in case of the hydraulic machine of aforementioned Japanese Laid-Open Patent Application 59-131776, a hydrostatic radial bearing is constituted by supplying high pressure oil from pistons to corresponding pressure chambers which are formed in 90° shifted positions between the drive flange and bearing sleeve according to the total number of the pistons, and a hydrostatic thrust bearing is constituted by supplying high pressure oil from pistons to corresponding drive shoes with pressure chambers provided on the drive flange according to the total number of the pistons, thereby supporting the radial and thrust loads and the moment load about the rotational shaft. Namely, the conventional hydrostatic radial and thrust bearings have a load supporting capacity only in the areas on the side of the acting point of the resultant force of hydraulic reaction force where high pressure oil is supplied from the pistons, and not in the areas away from the acting point or in the areas where high oil pressure is not supplied.

Nevertheless, the above-mentioned prior art hydraulic machine is required to support the imposed radial and thrust loads and the moment load about the rotational shaft not only by the hydrostatic bearing in the areas on the side of the acting point but also by the hydrostatic bearing in the areas away from the acting point.

Consequently, there occurs an imbalance between the hydrostatic bearing with a load supporting capacity, which is located on the side of the acting point, and the hydrostatic bearing without a load supporting capacity, which is located on the side away from the acting point, resulting in non-uniform thickness of oil films which are formed on the sliding surfaces of the drive flange and drive shoes. This will induce metal contact of the sliding surfaces in the areas away from the acting point, accelerating localized abrasive wear of the sliding surfaces and increasing the leak flows.

Especially in a case where the sliding surfaces of the hydrostatic radial bearing, such as the outer peripheral surfaces of the drive flange serving as the drive disc or the inner peripheral surfaces of the bearing sleeve, are abraded during use over a long time period, the gaps between the surfaces are broadened to promote unstable radial vibrations of the drive flange as well as the vibrations of contact between the piston and the cylinder block. As a result, a problem arises in that the increased fletching abrasion at the contacting portion brings about an increased degree of contacting stress of the pistons.

The present invention contemplates to solve the above-mentioned problems of the prior art, and has as an object the provision of a bent axis type variable displacement hydraulic machine employing a partial and/or total hydrostatic bearing support which can ensure operations of high stability and reliability by suppressing abrasive wear in the radial direction and leak flow rate during use over a long time period.

SUMMARY OF THE INVENTION

In accordance with the present invention, the above-stated objective is achieved by the provision of the bent axis type variable displacement hydraulic machine which includes a cylindrical casing having a head casing with suction and discharge passages, a rotational shaft rotatably inserted into the casing and having a drive disc at the inner distal end in the casing, with a cylinder block being located in the casing and having a plurality of axial cylinder bores, and a plurality of pistons being reciprocably received in the cylinder bores in the cylinder block and each pivotally supported at one end by the drive disc. A valve plate includes a pair of suction and discharge ports and has one end face in sliding contact with the cylinder block and the other end face tiltably in sliding contact with a tilting sliding surface on a head casing. A tilting mechanism tilts the valve plate together with the cylinder block, and a hydrostatic radial bearing is provided between the drive disc and the casing for supporting radial loads of hydraulic reaction forces acting on the drive disc in the radial and thrust directions. An oil passage conducts oil pressure to and from the hydrostatic radial bearing through one of the paired suction and discharge ports which ever is on the high pressure side, and the hydrostatic radial bearing is located in a position for balancing a moment occurring about the rotational shaft with respect to the acting point of the resultant force of mean hydraulic reaction force acting on the drive disc in the radial direction.

The hydraulic machine may be provided with a drive disc of a U-shaped in section having a disc portion for tiltably supporting the pistons and a hollow cylindrical portion extending from the disc portion in a direction away from the cylinder block, a support member for rotatably supporting the aforementioned rotational shaft, located in a position adjacent one end of the casing and in a space defined between the journal portion of the rotational shaft and the sectionally U-shaped drive disc, and a hydrostatic radial bearing provided between the outer periphery of the support member and the inner periphery of the hollow cylindrical portion of the drive disc.

Alternatively, the hydraulic machine may be constituted by a drive disc of a circular disc-like shape for tiltably supporting the pistons, and a hydrostatic radial bearing located between the outer periphery of the drive disc and the inner periphery of the casing.

Further, a plurality of hydrostatic radial bearings may be located relative to x- and y- axes which perpendicularly intersect the axis of the rotational shaft, including a first hydrostatic radial bearing located on the side of the acting point of the resultant force of mean hydraulic reaction force and beneath the x-axis and outside the shifting range of the acting point of the resultant force of the mean hydraulic reaction force, a second hydrostatic radial bearing located on the side away from the acting point of the resultant force of the mean hydraulic reaction force relative to the small y-axis and on the lower side of the x-axis, a third hydrostatic radial bearing located on the side away from the acting point of the resulting force of mean hydraulic reaction force and on or in the vicinity of the x-axis, and a fourth hydrostatic radial bearing located above the x-axis and on or in the vicinity of the y-axis.

In this case, preferably, the first and second hydrostatic radial bearings are located in positions satisfying the equation:

$$f_{LY} \times e_L = f_{RY} \times e_R,$$

wherein:
- $e_L$ is the distance along the x-axes spacing apart the center of sliding movements of the hydrostatic pad of the first bearing and the acting point of the resultant force of the mean hydraulic reaction force,
- $f_{LY}$ are the load components acting on the first hydrostatic pad in the y-axis direction,
- $e_R$ is the distance along the x-axis spacing apart the center of sliding movements of the hydrostatic pad of the second bearing and the acting point of the resultant force of mean hydraulic reaction force, and
- $f_{RY}$ are the load components acting on the second hydrostatic pad in the y-axis direction.

Further, with respect to the x- and y-axis which perpendicularly intersect the axis of the rotational shaft, there may be provided a first hydrostatic radial bearing located beneath the x-axis and on the side of the acting point of the resultant force of mean hydraulic reaction force at the same distance as the acting point in the direction of the x-axis, a second hydrostatic radial bearing located on the side away from the acting point of the resultant force of mean hydraulic reaction force and on or in the vicinity of the x-axis, and a third hydrostatic radial bearing located on the side of the acting point of the resultant force of mean hydraulic reaction force and in a position of point symmetry with the first hydrostatic radial bearing relative to the x-axis.

The bent axis type variable displacement hydraulic machine of the present invention is applicable as a pump of main hydraulic pressure source or as a drive motor in various hydraulic systems for construction machines.

With the above-described arrangements, although varying hydraulic reaction forces acting on the drive disc tend to produce moments about the rotational shaft in relation with the acting point of the resultant force of mean hydraulic reaction force, the hydrostatic radial bearing is so located as to hold such moment loads about the rotational shaft constantly in balanced state, ensuring formation of an oil film of uniform thickness on the sliding surfaces to prevent abnormal abrasive wear of the sliding surfaces while reducing the leak flow rate to a minimum.

DETAILED DESCRIPTION

Figure 1:
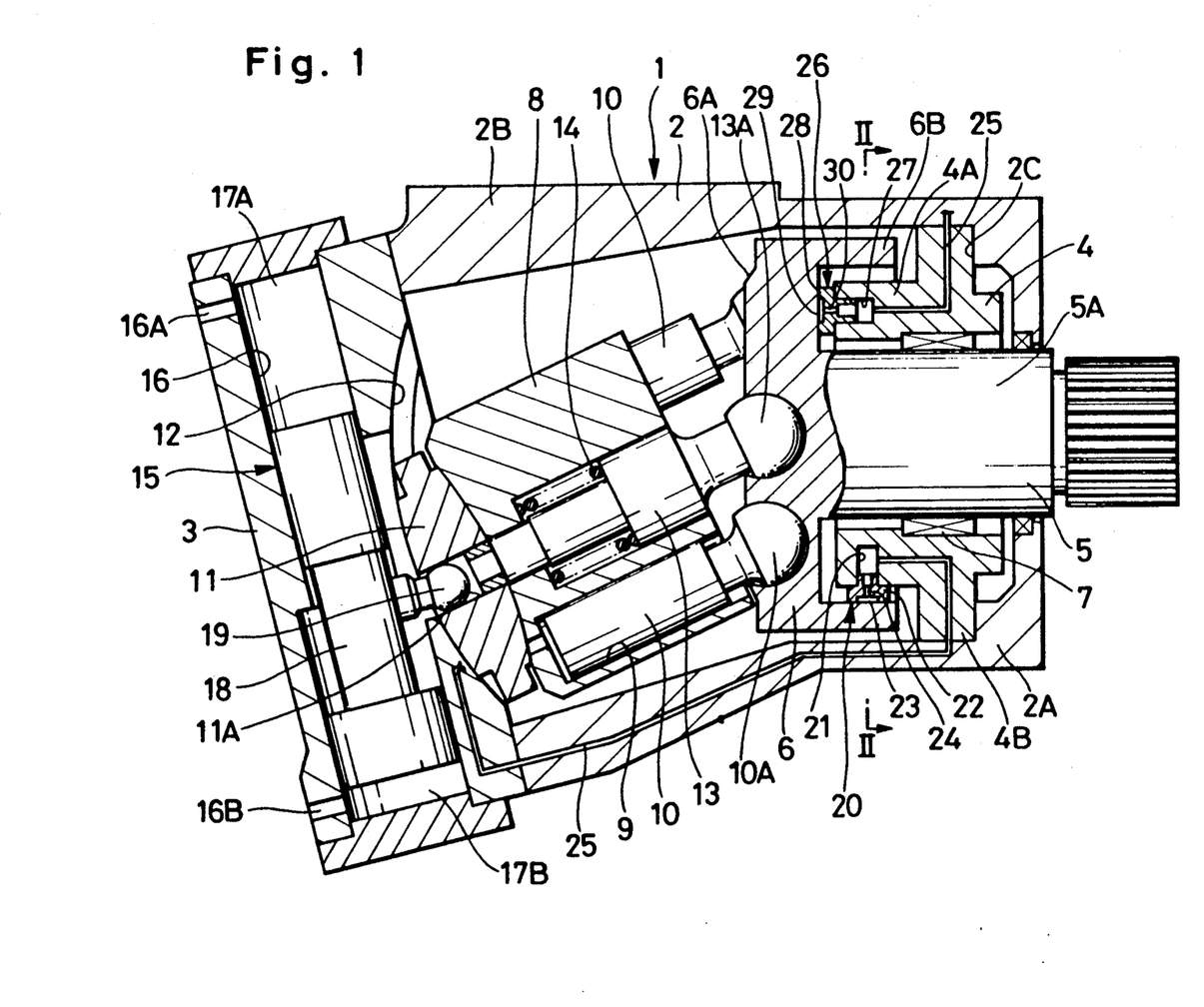
FIG. 1 is a vertical cross-sectional view of a bent-axis type variable displacement hydraulic machine constructed in accordance with a first embodiment of the present invention.
Figure 2:
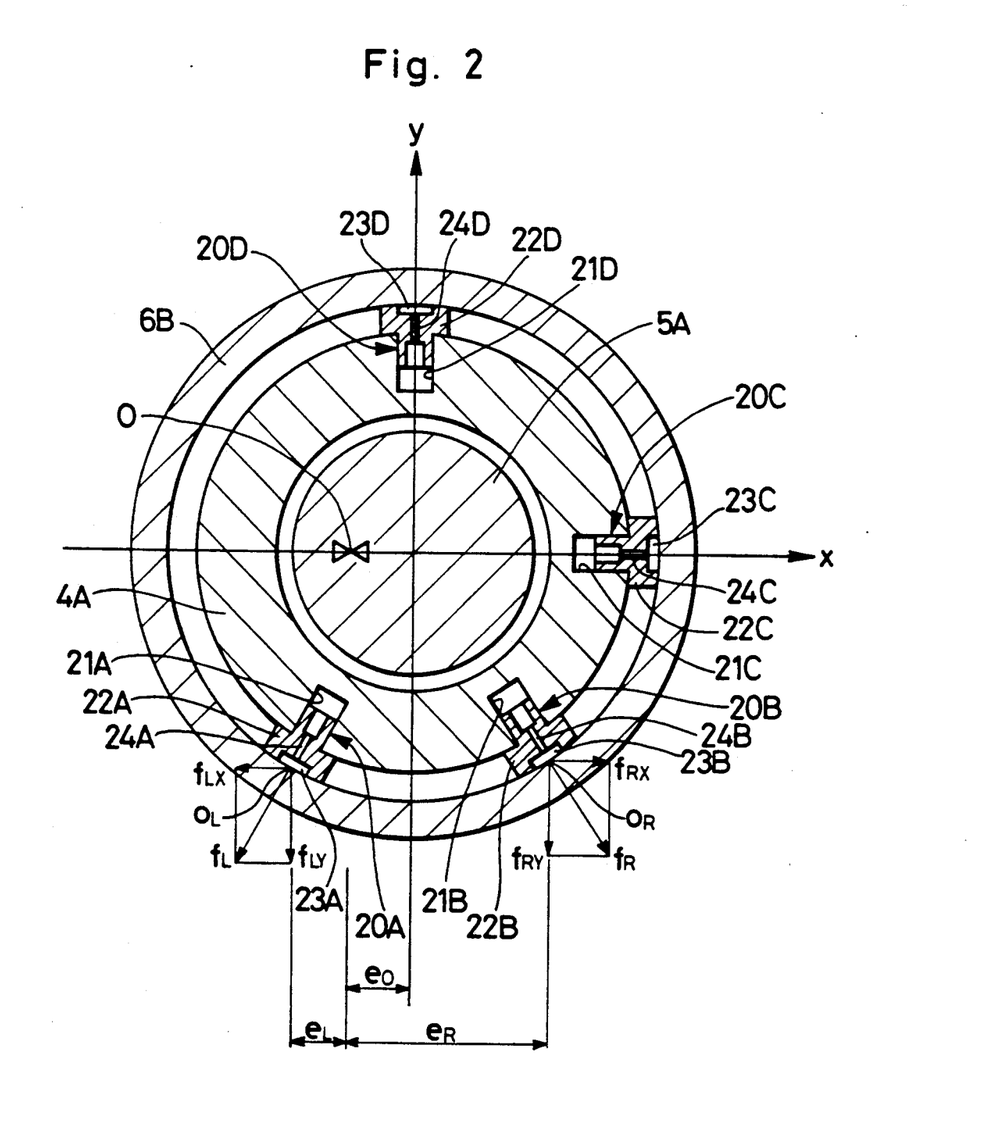
FIG. 2 is a cross-sectional view taken along the line II—II in FIG. 1.
Figure 3:
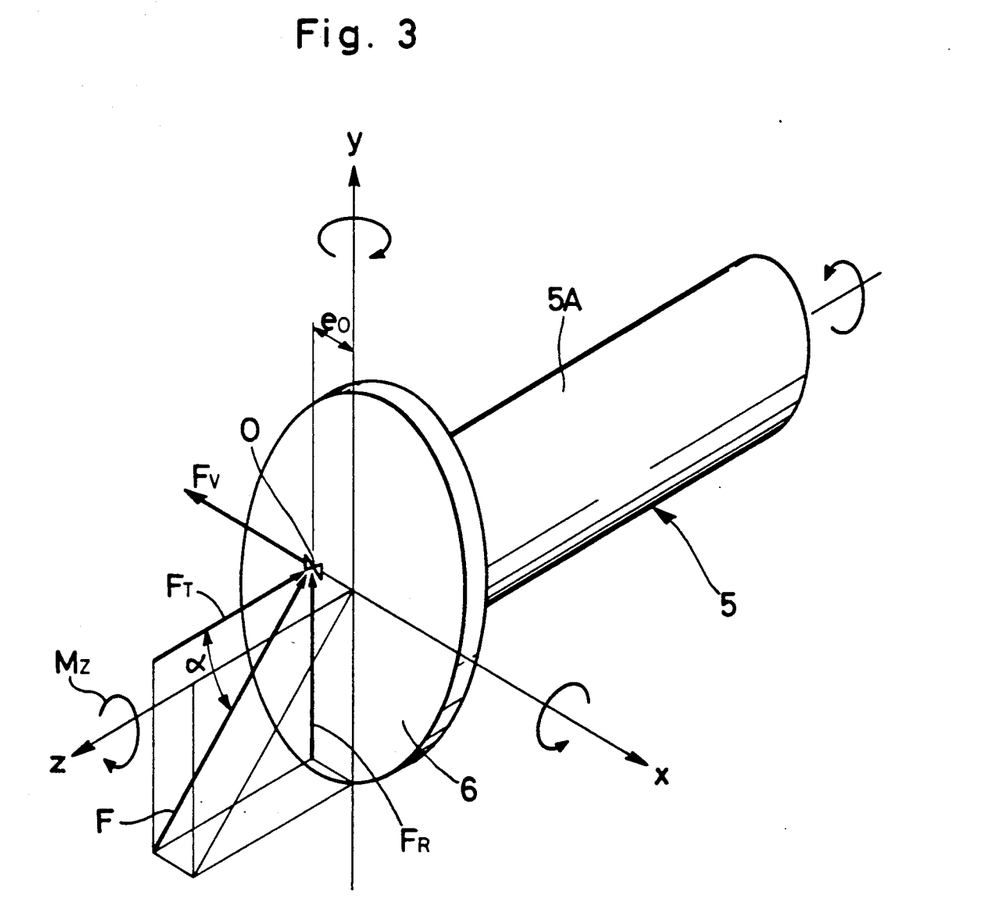
FIG. 3 is a diagrammatic illustration of a relationship of the hydraulic reaction forces acting on a drive disc with moment and side force.

Referring now to the drawings wherein like reference numerals are used throughout the various views to designate like parts and, more particularly, to FIGS. 1-3, according to these figures, a bent axis type variable displacement hydraulic machine according to the present invention includes a casing generally designated by the reference numeral 1 having a cylindrical casing body 2 with a small-diameter portion 2A and a large-diameter tilted portion 2B and a head casing 3 for closing an outer end of the tilted portion 2B of the casing body 2.

A bearing sleeve 4 is provided as a support member within the small-diameter portion 2A of the casing 2, with the bearing sleeve 4 including a sleeve portion 4A located in a space between an end portion 5A of a rotational shaft generally designated by the reference numeral 5, and a cylindrical portion 6B of the drive disc 6, and a flange portion 4B located around the outer periphery of the sleeve portion 4A and abuttingly supported by an inner stepped portion 2C of the small-diameter portion 2A.

The rotational shaft 5 extends into the casing 1 through the bearing sleeve 4 and is provided with a drive disc 6 of sectionally U-shape integrally at its distal end in the casing 1. In this instance, the drive disc is constituted by a disc portion 6A of a larger diameter, and a cylindrical portion 6B which is extended toward the flange portion 4B of the bearing sleeve 4 from the outer periphery of the disc portion 6A. The rotational shaft 5 is rotatably supported in the bearing sleeve 4 through a bearing 7, and the drive disc 6 is arranged to support hydraulic reaction forces of the pistons 10 through hydrostatic radial and thrust bearings 20 and 26.

A cylinder block 8 is provided within the casing 1 and is rotatable together with the rotational shaft 5, with the cylinder block 8 having a plurality of pistons 10 reciprocably received in the cylinders 9 which are bored axially in the cylinder block 8. The pistons 10 are each provided with a spherical portion 10A at a front end and are thereby pivotally connected to the disc portion 6A of the drive disc 6.

A square valve plate 11 has one end face thereof in sliding contact with the opposing end face of the cylinder block 8, and the other end face in sliding contact with a concave tilting sliding surface 12 formed on the head casing 3. The valve plate 11 has a through hole 11A bored at the center thereof to receive, from the opposite sides thereof, the tip ends of a center shaft 13 and a rocking pin 19. The valve plate 11 is further provided with a pair of suction and discharge ports (not shown) which are intermittently communicated with the cylinders 9 during rotation of the cylinder block 8. Irrespective of the tilted position of the valve plate 11, the suction and discharge ports are communicated respectively with a pair of suction and discharge passages (not shown) which are provided in the head casing and opened to the tilting sliding surface 12.

A center shaft 13 tiltably supports the cylinder block 8 between the drive disc 6 and valve plate 11, and has, at one end thereof, a spherical portion 13A pivotally supported in a centered position of the drive disc 6. The other end of the centered shaft 13, protruded through the cylinder block 8, is slidably received in a through hole 11A bored at the center of the valve plate 11 for centering the cylinder block 8 and the valve plate 11. A compression spring 14 serves to apply a predetermined pressure to the sliding surfaces of the cylinder block 8 and the valve plate 11.

A tilting mechanism generally designated by the reference numeral 15 is mounted in the head casing 3 for tilting the valve plate 11 along the tilting/sliding surface 12. The tilting mechanism 15 is constituted by a stepped cylinder bore 16 formed in the head casing 3 and having oil passages 19A and 19B at the opposite ends thereof, a servo piston 18 slidably fitted in the cylinder bore 16 and defining oil chambers 17A and 17B on the outer side of its opposite end portions, and a rocking pin 19 fitted in the servo piston 19 and having a spherical portion at its distal end pivotally fitted in the valve plate 11. The oil pressure received from an auxiliary pump through a tilting control valve (both not shown) is supplied to the oil chamber 17A or 17B through the oil passage 16A or 16B thereby driving the servo piston 18 to tilt the valve plate 11 and cylinder block 8.

First to fourth hydrostatic radial bearings 20A-20D respectively support the radial load components of mean hydraulic reaction force acting on the drive disc 6. As shown in FIG. 2, these hydrostatic radial bearings 20A to 20D are constituted by radial cylinder bores 21A to 21D which are formed on the outer periphery of the sleeve portion 4A of the bearing sleeve 4 in a particular relationship as will be explained hereinafter, hydrostatic pads 22A to 22D having small-diameter rod portions slidably fitted in the cylinder bores 21A to 21D and large-diameter pad portions positioned outside the cylinder bores 21A to 21D and held in sliding contact with the inner peripheral surface (hydrostatic bearing guide surface) of the cylindrical portion 6b of the drive disc, groove-like pressure chambers 23A to 23D formed on the outer surfaces of the pad portions of the hydrostatic pads 22A to 22D which are in sliding contact with the drive disc, and axial throttle passages 24A to 24D formed on the hydrostatic pads 22A to 22D to communicate the chambers in the cylinder bores 21A to 21D with the respective pressure chambers 23A to 23D. The hydrostatic radial bearings 20A to 20D, cylinder bores 21A to 21D, hydrostatic pads 22A to 22D, pressure chambers 23A to 23D and throttle passages 24A to 24D are hereafter collective referred to as hydrostatic radial bearing 20, cylinder bore 21, hydrostatic pad 22, pressure chamber 23 and throttle passage 24, respectively.

Oil passages 25 are formed in the casing 1 and bearing sleeve 4 to constantly supply a bearing control pressure to the hydrostatic radial bearings 20A to 20D. To draw in the high pressure oil which is suctioned or discharged through one of the paired suction and discharge ports in the valve plate 11, the oil passages 25 are opened at one end to the suction or discharge port whichever is on the higher pressure side, to the suction or discharge passage of the head casing 3 whichever is on the higher pressure side, or to a high pressure piping outside the casing, and at the other end to cylinder bores 21A to 21D of the hydrostatic radial bearings 20A to 20D to supply a bearing control pressure to the respective pressure chambers 23A to 23D. If desired, the oil passages 25 may be substituted with external pipings which run outside the casing 1.

Hydrostatic radial bearings 20A to 20D are located in the following particular positional relationship.

Referring to FIG. 3, with respect to axes x and y which perpendicularly intersect the axis z of the rotational shaft 5 on the front side of the drive disc 6, the resultant force of mean hydraulic reaction force of pistons 10 in the high pressure area has its acting point at 0 which is spaced from the point of intersection of the x- and y-axes by a distance $e_o$ in the direction of the x-axis. In this instance, the point O is referred to as an acting point of the resultant force of mean hydraulic reaction force, because the hydraulic reaction force F varies in the fashion of the symbol "$\infty$" according to the number of pistons in the high pressure area.

The radial and thrust loads $F_R$ and $F_T$ imposed by the above-mentioned hydraulic reaction force F are expressed as follows:

$$F_R = F \sin \alpha,$$
$$F_T = F \cos \alpha \qquad (1)$$

wherein $\alpha$ is the tilting angle of the cylinder block 8. When the tilting angle $\alpha$ is minimum, the radial load $F_R$ becomes minimum and the thrust load $F_T$ becomes maximum. On the other hand, when the tilting angle $\alpha$ is maximum, the radial and thrust loads $F_R$ and $F_T$ become maximum and minimum respectively.

With respect to the positional relationship of the hydrostatic radial bearings 20A to 20D, the first hydrostatic radial bearing 20A is located on the side of the acting point 0 of the resultant hydraulic reaction force and outside the shifting range of the acting point 0 of the resultant force which shifts in the shape of "$\infty$" (on the left side of the acting point 0 in FIG. 2). The second hydrostatic radial bearing 20B is located on one side of the y-axis away from the acting point 0 of the resultant force (to the right of the y-axis in FIG. 2) and beneath the x-axis in a particular positional relationship with the first hydrostatic bearing 20A. The third hydrostatic radial bearing 20C is located on the side away from the acting point of the resultant force (to the right of the y-axis) and on or in the vicinity of the x-axis. The fourth hydrostatic radial bearing 20D is located above the x-axis and on or in the vicinity of the y-axis.

With regard to the first hydrostatic radial bearing 20A, it is considered that the radial load $f_L$ which is exerted at the point of intersection $O_L$, where the axis of the hydrostatic pad 22A intersects the inner peripheral surface of the cylindrical portion 6B of the drive disc 6, has a component $f_{LX}$ of the x-axis direction and a component $f_{LY}$ of the y-axis direction, and that the acting point 0 of the resultant force is spaced from the point of intersection $O_L$ by a distance $e_L$ in the direction of the x-axis. With regard to the second hydrostatic radial bearing 20B, it is considered that the radial load $f_R$ which is exerted at the point of intersection $O_R$, where the axis of the hydrostatic pad 22B intersects the inner peripheral surface of the cylindrical portion 6B, has a component $f_{RX}$ of the x-axis direction and a component $f_{RY}$ of the y-axis direction, and that the action point O of the resultant force is spaced from the point of intersection $O_R$ by a distance $e_R$. Under these conditions, the first and second hydrostatic radial bearings 20A and 20B are located inn the following positional relationship:

$$f_{LY} \times e_L = f_{LX} \times e_R \qquad (2)$$

By so locating, they act to balance the moment loads Mz about the z-axis as will be explained hereinafter.

Further, in FIG. 1, hydrostatic thrust bearings 26 are each constituted, similarly to the above-described hydrostatic radial bearing 20, by an axial cylinder bore 27 formed into the inner end face of the sleeve portion 4A of the bearing sleeve 4, a hydrostatic pad 28 having a small-diameter rod portion slidably fitted in the cylinder bore 27 and a large-diameter pad portion held in sliding contact with the inner end face (hydrostatic bearing guide surface) of the sleeve portion 4A, a groove-like pressure chamber 29 formed on the pad portion of the hydrostatic pad 29, and a throttle passage 30 bored in the hydrostatic pad 28 in such a manner as to communicate a chamber in the cylinder bore 27 with the pressure chamber 29. From one of the suction and discharge port whichever is on the high pressure side, the chamber in the cylinder bore 27 of the hydrostatic thrust bearing 26 is constantly supplied with high pressure oil through the passages 25. Although only one hydrostatic thrust bearing 26 is shown in FIG. 1, a plurality of thrust bearings of the same construction may be provided around the sleeve portion 4A of the bearing sleeve 4 to balance the moment loads about the x- and y-axes in a manner similar to the hydrostatic radial bearings 20.

When applied as a hydraulic pump, the bent axis type variable displacement hydraulic machine of this embodiment operates in the following manner.

First, the valve plate 11 is tilted to the maximum tilted position of FIG. 1 together with the cylinder block 8 by operation of the tilting mechanism 15. For this purpose, the servo piston 18 is displaced by supplying oil pressure from the auxiliary pump to the oil chamber 17A in the cylinder bore 16. By so doing, the pivoting pin 19 is displaced together with the servo piston 18, tilting the valve plate 11 under guidance of the tilting guide surface 12. Consequently, the cylinder block 8 is tilted together with the center shaft 13 into the position shown in FIG. 1, with its rotational axis inclined relative to the axis of the rotational shaft 5.

Next, the rotational shaft 5 is rotated by an engine, electric motor or other suitable drive source, whereupon the cylinder block 8 is rotated together with the rotational shaft 5 since the drive disc 6 of the rotational shaft 5 is connected to the pistons 10 in the respective cylinders of the cylinder block 8. Consequently, the pistons 10 are reciprocated in the respective cylinders 9 during rotation of the cylinder block 8. In the suction stroke when each piston 10 is moved away from the cylinder 9, the operating oil is drawn into the cylinder 9 from a suction/discharge passage through a suction/discharge port, and, in the discharge stroke, when the piston 10 is moved into the cylinder 9, the operating oil in the cylinder 9 is pressurized and discharged through a suction/discharge port and a suction/discharge passage.

In this connection, in a bent axis type hydraulic pump of this type, in proportion to the number of pistons serving for generating the discharge pressure (e.g., in case the total number of pistons is seven, the maximum number of pressurizing pistons is four, the minimum number of pressurizing pistons is three, and the average number of pressurizing pistons is 3.5), the load of hydraulic reaction force is exerted on the drive disc 6 in synchronism with the rotational speed of the rotational shaft 5. The load which is exerted on the drive disc 6 is diffused at the support surface of the spherical portion 10A into radial load $F_R$ with radial components and thrust load $F_T$ with axial components. In this instance, with respect to the x- and y-axes which perpendicularly intersect the axis of the rotational shaft 5, moment loads about the x-, y- and z-axes are induced by the hydraulic reaction forces resulting from piston operations. These loads consisting of the loads of hydraulic reaction forces of pistons and the moment loads are supported by the hydrostatic radial and thrust bearings 20 and 26 on the bearing sleeve 4 which serves as a support member. Namely, the radial and thrust loads are supported by sliding bearing actions of the hydrostatic pads 22 and 28 with and from hydrostatic and hydrodynamic actions of the hydrostatic pressures in the pressure chambers 23 and 20 of the pads 22 and 28 of the respective hydrostatic bearings 20 and 26.

Now, the manner of supporting the radial component of the loads, which are exerted on the drive disc 6, is explained more particularly with reference to FIG. 3.

As mentioned hereinbefore, the radial component load $F_R$ of the overall hydraulic reaction force F of pistons is shifted in the fashion of ∞ about the acting point O of the resultant force of mean hydraulic reaction force according to the number of pistons in high pressure areas on the side of the acting point O. Besides, the radial load $F_R$ varies in synchronism with the number of pistons in the high pressure area, the load becoming zero at a tilt angle α of 0° and becoming maximum at the maximum tilt angle.

Therefore, in the present embodiment, four hydrostatic radial bearings 20A to 20D are located around the outer periphery of the sleeve portion 4A of the bearing sleeve 4 in the particular positional relations as shown in FIG. 2. In addition to the radial load $F_R$ which is imposed on the drive disc 6, the moment load $M_z$ about the axis z of the rotational shaft 5 is supported by these hydrostatic radial bearings 20A to 20D.

More specifically, since the acting point O of the resultant force of mean hydraulic reaction force deviates from the axis z of the rotational shaft 5 by the distance $e_o$, the moment load $M_z$ about the z-axis is turned into a moment relevant to the acting point O of the resultant force when the radial load $F_R$ is exerted on the acting point O.

However, in the present embodiment, the first hydrostatic radial bearing 20A is located on the side of the acting point O of the resultant force of mean hydraulic reaction force, and the second hydrostatic radial bearing 20B is located on the side away from the acting point of the resultant force, in the particular positional relationship of the Equation (2), so that they can support the moment load $M_z$ about the z-axis, relevant to the acting point of the resultant forces, in balanced state.

Further, side force is generated in the sliding portion of the valve plate 11 depending upon the shape or other factors of the suction/discharge port which is on the high pressure side. Through the pistons 10 or center joint 13, this side force acts on the drive disc 6 as $F_y$ in the direction indicated by an arrow in FIG. 3. However, in the present embodiment, the third hydrostatic radial baring 20C is located on the side away from the acting point of the resultant force and on the x-axis, so that the high pressure oil introduced into its pressure chamber 23B imposes an inverse radial force to the drive disc 6 to counteract the side force $F_y$. As a result, it becomes possible to support the side force $F_y$ by the third hydrostatic radial bearing 20C and to balance the side force $F_y$ by adjusting the inverse radial force.

Further, the resultant force of the hydraulic reaction force F of pistons varies in dependence upon the number of pistons in the high pressure area, with variations in the direction of the y-axis (in the upward and downward directions). However, in the present embodiment, the fourth hydrostatic radial bearing 20D is located above the x-axis and on the y-axis, so that the variations in the resultant force of the hydraulic reaction forces, which are caused by variations in the number of pistons in the high pressure area, can be suitably supported by the fourth hydrostatic radial bearing 20D.

Thus, according to the present embodiment, the radial load $F_R$ exerted on the acting point of the resultant force is satisfactorily supported by the first to fourth hydrostatic radial bearings 20A to 20D in the above-described manner. In this instance, the first and second hydrostatic radial bearings 20A and 20B which are located to satisfy the relationship of Equation (2) are capable of balancing the moment load $M_z$ about the z-axis, relevant to the acting point ) of the resultant force, while supporting the side force $F_y$ and variations in the resultant force of hydraulic reaction forces by the third and fourth hydrostatic radial bearings 20C and 20D, respectively.

Therefore, the first to fourth hydrostatic radial bearings 20A to 20D can maintain the respective hydrostatic pads 22A to 22D constantly inn an appropriate posture to impart a suitable surface pressure to the sliding surfaces of the respective pads 22A to 22D, thereby precluding extremely inclined support. As a result, it becomes possible to prevent localized abrasive wear of the hydrostatic pads 22A to 22D and to maintain an oil film of uniform thickness between the sliding surfaces of the hydrostatic pads 22A to 22D and the hydrostatic bearing guide surface of the drive disc. Accordingly, the leaks from the sliding surface of the respective hydrostatic pads 22A to 22D, which would lead to power losses, can be minimized to a minimum.

Figure 4:
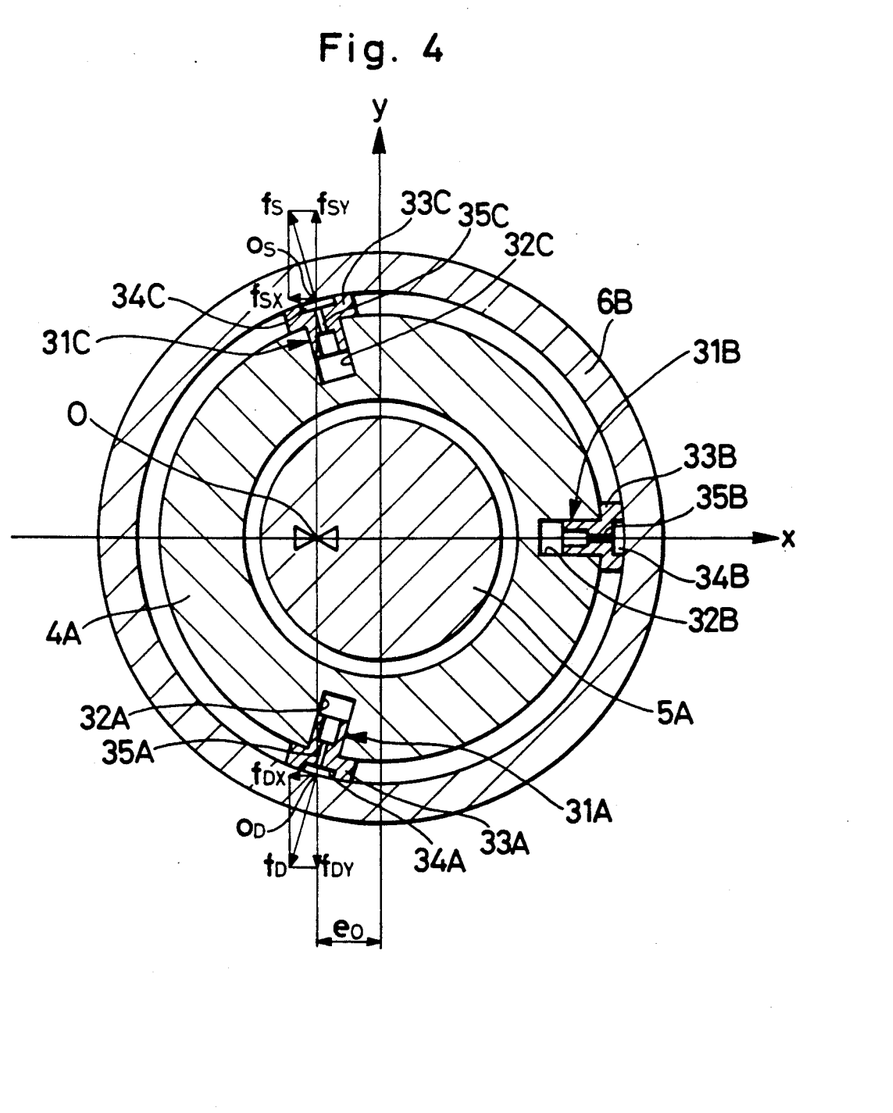
FIG. 4 is a cross-sectional view similar to FIG. 2 of a second embodiment of a bent axis type variable displacement hydraulic machine in accordance with the present invention.

A feature of the embodiment of FIG. 4 resides in that three hydrostatic radial bearings are used to support the radial load $F_R$, side force $F_y$ and moment load $M_z$ about the z-axis.

More specifically, in FIG. 4, hydrostatic radial bearings 31A–31C are provided, with the hydrostatic radial bearings 31A to 31C including radial cylinder bores 32A to 32C which are formed on the outer periphery of the sleeve portion 4A of the bearing sleeve in particular positional relations with each other similar to the first embodiment, hydrostatic pads 33A to 33C having small-diameter rod portions slidably fitted in the cylinder bores 32A to 32C and large-diameter pad portions held in sliding contact with the inner peripheral surface of the cylindrical portion 6B of the drive disc 6, groove-like pressure chambers 34A to 34C formed on the pad surface in sliding contact with the drive disc, and axial throttle passages 35A to 35C formed in the pads 33A to 33C to communicate chambers in the cylinder bores 32A to 32C with the pressure chambers 34A to 34C. High oil pressure is constantly lead to the cylinder bores 32A to 32C through the passages 25. Hereafter, the hydrostatic radial bearings 32A to 32C, hydrostatic pads 33A, to 33C, pressure chambers 34A to 34C and throttle passages 35A to 35C are referred to collectively as hydrostatic radial bearing 31, cylinder bore 32, hydrostatic pad 33, pressure chamber 34 and throttle passage 35, respectively.

The above-mentioned hydrostatic radial bearings 31A to 31C are located in the following positional relationship with respect to each other.

The first hydrostatic radial bearing 31A is located below the x-axis on the side of the acting point O of the resultant force of mean hydraulic reaction forces at a distance $e_o$ coinciding with the acting point O of the resultant force in distance on the x-axis; the second hydrostatic radial bearing 31B is located on the side away from the acting point O and on or in the x-axis; and the third hydrostatic radial bearing 31C is located on the side of the acting point O of the resultant force and in point symmetry with the first hydrostatic radial bearing 31A relative to the x-axis.

When applied as a hydraulic pump, the embodiment of FIG. 4 with the above-described arrangement operates in the same manner as the first embodiment.

In the embodiment of FIG. 4 the three hydrostatic radial bearings 31A to 31C are located around the outer periphery of the sleeve portion 4A of the bearing sleeve 4 in the particular positional relationship described above to thereby support the radial load $F_R$, side force $F_v$ and moment load $M_z$.

More specifically, the first and third hydrostatic radial bearings 31A and 31C are located in off-axis positions at a distance of $e_o$ from the x-axis and in point-symmetrical positions above and below the x-axis relative to the acting point O of the resultant force of mean hydraulic reaction forces. As a result the point of intersection $O_D$, where the axis of the hydrostatic pad 33A of the first radial bearing 31A intersects the inner peripheral surface of the cylindrical portion 6B of the drive disc 6, is located at the same distance from the acting point O of the resultant forces as the point of intersection $O_S$ where the axis of the hydrostatic pad 33C of the third radial bearing 31C intersects the inner peripheral surface of the cylindrical portion 6B, and the mean hydraulic reaction force exerted on the acting point of the resultant force has the same lines of action with respect to the first and third hydrostatic radial bearings 31A and 31C.

Thus, of the components $f_{DX}$ and $f_{DY}$ in the x- and y-axis directions of the radial load $f_D$ exerted on the point of intersection $O_D$ on the side of the first hydrostatic radial bearing 31A and the components $f_{SX}$ and $F_{SY}$ in the x-and y-axes directions of the radial load $f_S$ exerted on the point intersection $O_S$ on the side of the third hydrostatic radial bearing 31C, the y-axis components $f_{DY}$ and $f_{SY}$ can be supported in balanced state. Consequently, even if a moment $M_z$ about the z-axis is generated by a radial load $f_R$ exerted on the acting point O of the resultant force of mean hydraulic reaction forces, it can be supported in balanced state.

Further, since the second hydrostatic radial bearing 31B is located on the x-axis on the side away from the acting point of the resultant force, it can balance the side force $F_v$ which ould be exerted on the drive disc 6.

Furthermore, although the resultant force of the total hydraulic reaction force of pistons varies in dependence upon the number of pistons in the high pressure area, such variations in the resultant force can be suitably supported by the third hydrostatic radial bearing 31C.

In this manner, similarly to the first embodiment, the embodiment of FIG. 4 is capable of maintaining the hydrostatic pads 33A to 33C of the first to third radial bearins 31A to 31C in appropriate posture for imparting a surface pressure to the sliding surfaces of the respective pads 33A to 33C, preventing extremely inclined support thereof. This prevents localized abrasive wear of the hydrostatic pads 33A to 33C, and permits a maintenance of an oil film of uniform thickness between the sliding surfaces of the hydrostatic pads 33A to 33C and the hydrostatic bearing guide surface of the drive disc. Accordingly, it becomes possible to suppress the leaks from the sliding surfaces of the hydrostatic pads 33A to 33C to a minimum and to reduce the power losses which would result from such leaks.

Figure 5:
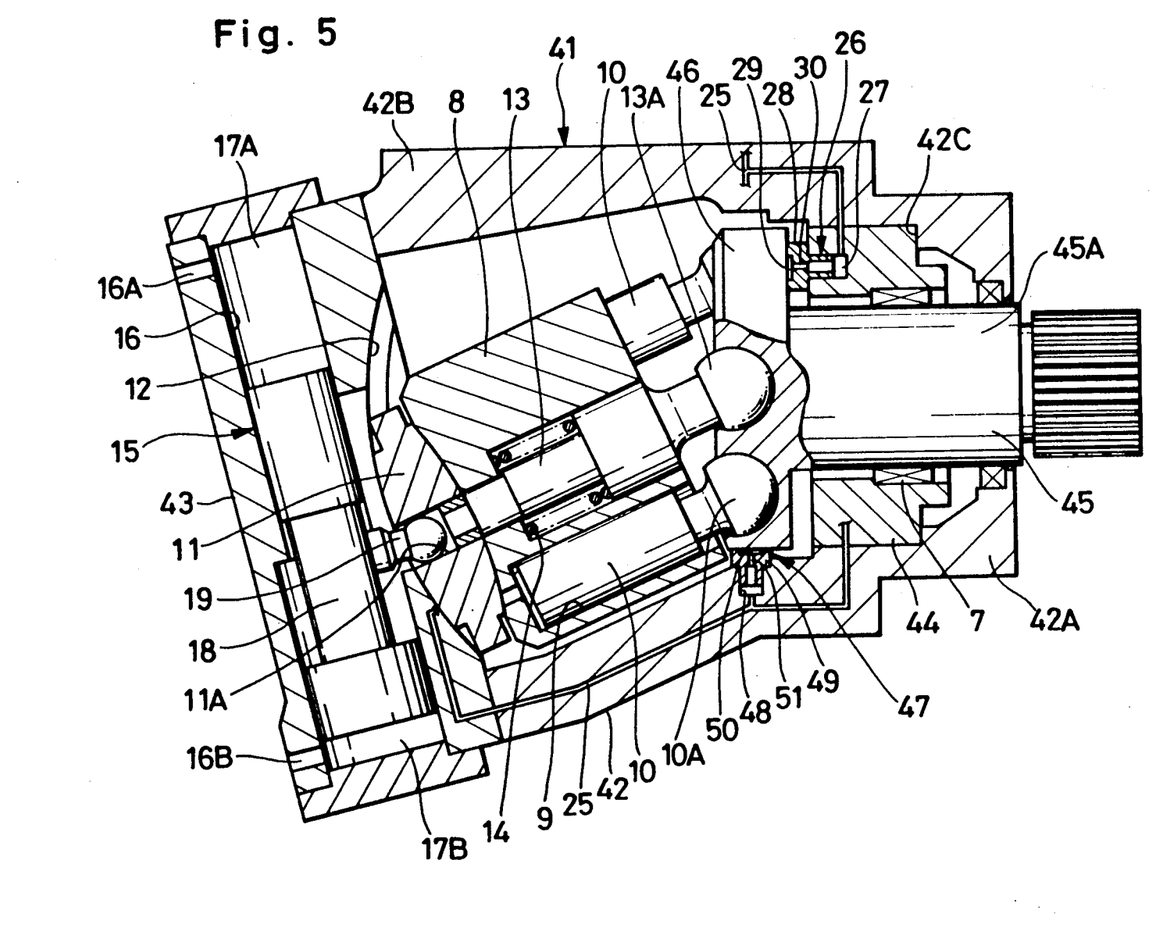
FIG. 5 is a vertical cross-sectional view of a bent axis type variable displacement hydraulic machine constructed in accordance with a third embodiment of the present invention.

A feature of the embodiment of FIG. 5 resides in that hydrostatic radial bearings are located in particular positions on the part of the casing, with the respective hydrostatic pads held in sliding contact with the outer periphery of the drive disc.

More specifically, in FIG. 5, a casing generally designated by the reference numeral 41 includes a cylindrical casing body 42 having a small-diameter 42A and an inclined large-diameter portion 42B, and an end casing 43 closing the outer open end of the inclined portion 42B similarly to the casing of the first embodiment except that the inclined portion 42B has a greater thickness to provide hydrostatic radial bearings 47 as will be described hereinafter.

A bearing sleeve 44 is provided as a support member in the small-diameter portion 42A of the casing body 42, and is formed substantially in a hollow cylindrical shape different from the counterpart in the first embodiment. The bearing sleeve 44 has one end thereof abutted against and supported by a stepped portion 42C on the inner periphery of the small-diameter portion 42A, in this case, the bearing sleeve 44 incorporating only hydrostatic thrust bearings 26 of the same construction as in the first embodiment.

A rotational shaft generally designated by the reference numeral 45 has an end portion extended through the bearing sleeve 44 and is provided with a drive disc 46 at the inner end of the shaft portion 45 in the casing 41. In this embodiment, the drive disc 46 is formed in a circular disc-like shape. The rotational shaft is rotatably supported by the bearing sleeve 44 through a bearing 7, and the drive disc 46 is arranged to support hydraulic reaction forces of pistons through hydrostatic thrust bearings 26 in the same manner as in the first embodiment.

Hydrostatic radial bearings 47 are provided on the inner periphery of the inclined portion 42B of the casing 42 in four spaced positions which are in the particular positional relationship as shown in FIG. 2 or in three spaced positions which are in the particular positional relationship as shown in FIG. 4. FIG. 5 shows only one of these hydrostatic radial bearings as a representative. The hydrostatic radial bearing 47 includes a cylinder bore 48 formed on the inner periphery of the inclined portion 42B of the casing 42 in a position opposing the outer periphery of the drive disc 46, a hydrostatic pad 49 having a small-diameter rod portion slidably fitted in the cylinder bore 48 and a large-diameter pad portion held in sliding contact with the outer peripheral surface of the drive disc 46, a pressure chamber formed in the surface of the pad 49 in sliding contact with the drive disc 46, and a throttle passage 51 for supplying a bearing control pressure to the pressure chamber 50. The cylinder bore 48 is supplied with high oil pressure through an oil conduit 25.

In the embodiment of FIG. 5, four or three hydrostatic radial bearings 48 which are located in the particular positional relationship as shown in FIG. 2 or FIG. 4 operate in the same manner and have the same effects as in the foregoing embodiments.

Figure 6:
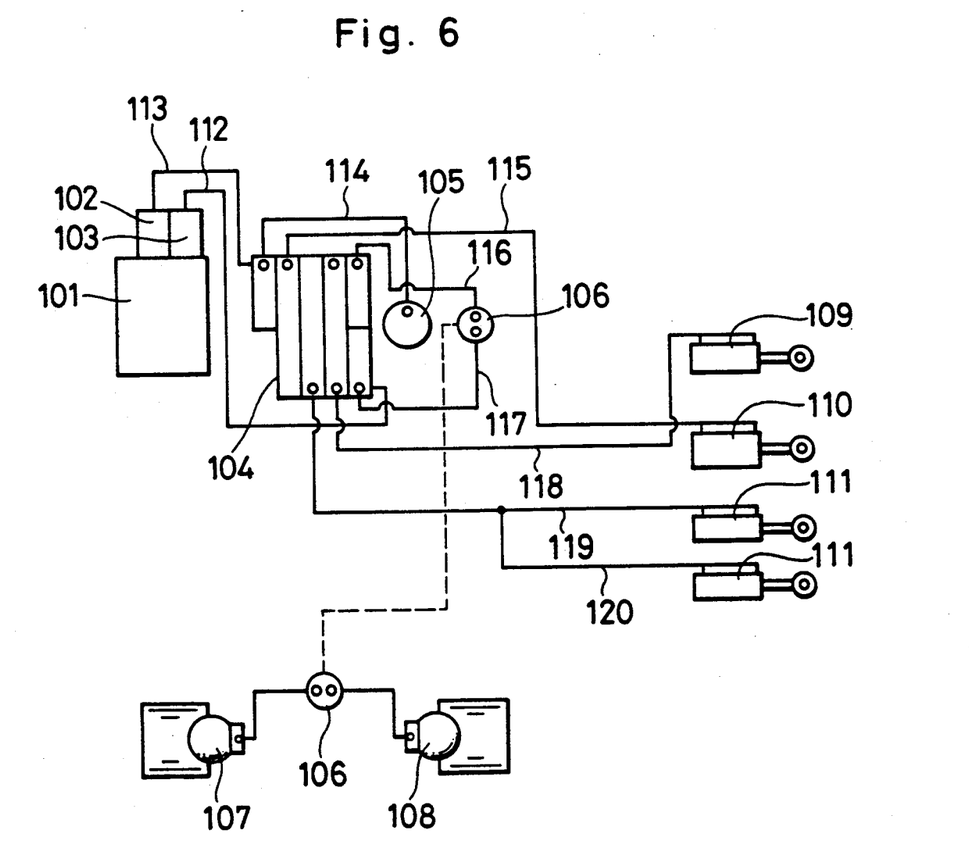
FIG. 6 is a schematic circuit diagram of a construction machine hydraulic system incorporating the bent axis type variable displacement hydraulic machine constructed in accordance with the present invention.

Referring to FIG. 6, there is shown a hydraulic circuit diagram of a hydraulic system for a construction machine like power shovel, employing the bent axis type variable displacement hydraulic machine of the invention.

In FIG. 6, the hydraulic system includes an engine 101 serving as a drive source for hydraulic pumps 102, 103, with hydrostatic radial bearing support according to the invention. A group of control valves 104 control distribution of fluid power from the pumps 102 and 103. The system further includes a rotating motor 105 and a center joint 106 relaying the power from the group of control valves 104. Vehicle drive hydraulic motors 107, 108 are mounted on the lower vehicle body, and a bucket operating hydraulic cylinder 109, an arm operating hydraulic cylinder 110, and boom operating hydraulic cylinders 111 are provided with conduits 112-120 interconnecting the aforementioned hydraulic components or elements.

With the construction machine hydraulic system arranged in the above-described manner, the high fluid pressures, which are discharged from the hydraulic pumps 102 and 103 driven from the engine 101, are fed through the control valves 104 to the rotating hydraulic motor 105 which drives the rotating mechanism, the travelling hydraulic motors 107 and 108 which drive the travelling mechanism, or the boom, bucket and arm hydraulic cylinders 109 to 111 to perform an excavating operation.

In a case where the hydraulic machine of the present invention is applied as hydraulic pumps 102 and 103 for construction machine, there will be obtained hydraulic pumps which can operate wit high stability and reliability and with less oil leaks even when the tilt angles of the pumps 102 and 103 are increased for the purpose of enhancing the travelling and excavating powers for a higher performance. Similar effects can be produced when the invention is applied to the rotating motor 105 or to the hydraulic vehicle drive motors 107 and 108.

Although the invention has been described by way of total hydrostatic support type hydraulic pumps, it is to be understood that the invention can be realized as partial hydrostatic support type machines employing the radial hydrostatic bearing 20 (31, 47) in combination with a mechanical anti-friction bearing (e.g., a roller bearing) in place of the hydrostatic thrust bearing 26. In short, the present invention is applicable to hydraulic machines which include at least a hydrostatic radial bearing.

In case the hydraulic machine of the present invention is applied as a reversible hydraulic motor, the paired suction and discharge ports formed in the valve plate as well as the paired suction and discharge passages formed in the head casing become a high pressure port, so that it is advisable to provide a shuttle valve between the suction and discharge ports or between the suction and discharge passages, drawing out high oil pressure through the shuttle valve and supplying same as a bearing control pressure to the hydrostatic radial bearings.

Further, although the lifting mechanism 15 has been shown as being provided in the head casing 3 in the foregoing embodiments, it may be substituted with a tilting mechanism which is located on a side wall of the casing body 2 (42) and which is arranged to tilt the cylinder block and valve plate through a yoke with one end thereof supported on a trunnion within the casing.

In addition to the examples of application given above, the hydraulic machine according to the present invention is applicable to hydraulic screw-down mechanisms for rolling mills, hydraulic systems of powder molding machines, injection molding machines, high speed foregoing machines operating in a high temperature environment, tunnel excavating machines and other hydraulically operated machines.

As clear from the foregoing particular description, the hydraulic machine of the invention is provided with a plural number of hydrostatic radial bearings in such a manner as to balance constantly the moment loads about the rotational shaft, relevant to the acting point on the drive disc of the hydraulic reaction forces varying according to the number of pistons in the high pressure area. This arrangement has a number of advantages.

More particularly, it becomes possible to form an oil film of a uniform thickness between the drive disc and sliding surfaces of the hydrostatic radial bearings, and therefore to prevent abnormal abrasive wear of the sliding surfaces of the hydrostatic bearing pads and the hydrostatic guide surface of the drive disc, ensuring sufficient durability even in operations over a long period of time.

Additionally, the formation of an oil film of uniform thickness between sliding surfaces will lead to suppression of oil leaks from the sliding surfaces to a minimal rate and therefore to reduction of power losses.

Furthermore, one of the hydrostatic radial bearings, which is located in a position away from the acting point of the resultant force and on or in the vicinity of the x-axis can stably support the side forces acting on the drive disc.

Moreover, another one of the radial hydrostatic bearings, which is located above the x-axis and on or in the vicinity of the y-axis, can stably support variant components of the radial loads exerted by hydraulic reaction forces.

What is claimed is:

1. The bent axis type variable displacement hydraulic machine comprising:
   a cylindrical casing having a head casing with suction and discharge passages;
   a shaft rotatably mounted in the casing and having a drive disc at an inner distal end thereof received in said casing;
   a cylinder block located in said casing and having a plurality of axially extending cylindrical bores;

a plurality of pistons respectively reciprocally received in said cylindrical bores, each of said pistons being pivotably supported at one end by said drive disc;

a valve plate having a pair of suction and discharge ports and having one end face in sliding contact with said cylinder block and an opposite end face tiltably in sliding contact with a tilting sliding surface on said head casing;

a tilting mechanism for tilting said valve plate together with said cylinder block;

a hydrostatic radial bearing provided between said drive disc and casing for supporting radial loads of hydraulic reaction forces acting on said drive disc in radial and thrust directions as a result of operation of said pistons;

oil passages for conducting oil pressure to and from said hydrostatic radial bearing through one of said paired suction and discharge ports whichever is on a high pressure side, wherein said hydrostatic radial bearing is located in a position for balancing moment loads occurring about said shaft with respect to an acting point of the resultant force of mean hydraulic reaction forces on said drive disc, has a U-shape in section and is open at one end and includes a disc portion adapted to tiltably support said pistons and a hollow cylindrical portion extending from said disc portion in a direction away from said cylinder block, a support member is provided for rotatably supporting said shaft, said support member being located in a position adjacent one end of said casing and in a space defined between a journal portion of said shaft and said drive disc, and wherein said hydrostatic radial bearing is provided between an outer periphery of said support member and an inner periphery of said hollow cylindrical portion.

2. A bent axis type variable displacement hydraulic machine as defined in claim 1, wherein said hydrostatic radial bearing is located relative to a x- and y-axis of said shaft, said hydrostatic radial bearing including a first hydrostatic radial bearing located on a side of said acting point of the resultant force of mean hydraulic reaction forces and beneath said x-axis and outside a shifting range of said acting point of said resultant force, a second hydrostatic radial bearing located on the side away from said acting point of said resultant force of mean hydraulic reaction forces relative to said y-axis and on a lower side of said x-axis, a third hydrostatic radial bearing located on a side away from said acting point of said resultant force of mean hydraulic reaction forces and on or in a vicinity of said x-axis, and a fourth hydrostatic radial bearing located above said x-axis and on or in a vicinity of said y-axis.

3. A bent axis type variable displacement hydraulic machine as defined in claim 2, wherein said first and second hydrostatic radial bearings are located in positions satisfying the following equation:

$$f_{LY} \times e_L = f_{RY} \times e_R.$$

where:

$e_L$ = a distance along said x-axis spacing apart the center of sliding movement of said hydrostatic pad of said first hydrostatic radial bearing and said acting point of the resultant force of mean hydraulic reaction forces, $f_{LY}$ = load components acting on the hydrostatic pad of said first bearing in the y-axis direction, $e_R$ = a distance along said x-axis spacing apart the center of sliding movement of said hydrostatic pad of said second hydrostatic radial bearing and said acting point of said resultant force of mean hydraulic reaction forces, and $f_{RY}$ = a load component acting on the hydrostatic pad of said second bearing in the Y-axis direction.

4. A bent axis type variable displacement hydraulic machine as defined in claim 1, wherein, relative to the x- and y-axes, said hydrostatic radial bearing includes a first hydrostatic radial bearing located beneath said x-axis and on a side of said acting point of the resultant force of mean hydraulic reaction forces in a position coinciding with said acting point of said resultant force in distance along said x-axis, a second hydrostatic radial bearing located on a side away from said acting point of the resultant force of mean hydraulic reaction forces and on or in a vicinity of said x-axis, and a third hydrostatic radial bearing located on the side of said acting point of the resultant force of mean hydraulic reaction forces and in a position of point symmetry with said first hydrostatic radial bearing relative to said x-axis.

5. A bent axis type variable displacement hydraulic machine comprising:

a cylindrical casing having a head casing with suction and discharge passages;

a shaft rotatably mounted in the casing and having a drive disc at an inner distal end thereof received in said casing;

a cylinder block located in said casing and having a plurality of axially extending cylindrical bores;

a plurality of pistons respectively reciprocably received in said cylindrical bores, each of said pistons being pivotably supported at one end by said drive shaft;

a valve plate having a pair of suction and discharge ports and having one end facing in sliding contact with said cylinder block and an opposite end face tiltably in sliding contact with a tilting sliding surface on said head casing;

a tilting mechanism for tilting said valve plate together with said cylinder block;

a hydrostatic radial bearing provided between said drive disc and casing for supporting radial loads of hydraulic reaction forces acting on said drive disc in radial and thrust directions as a result of operation of said pistons;

oil passages for conducting oil pressure to and from said hydrostatic radial bearing through one of said paired suction and discharge ports whichever is on the high pressure side, wherein said hydrostatic radial bearing is located in a potion for balancing moment loads occurring about said rotational shaft with respect to an acting point of the resultant force of mean hydraulic reaction forces on said drive disc, said hydrostatic radial bearing is located relative to an x- and y-axis perpendicularly intersecting the axis of said shaft, said hydrostatic radial bearing including a first hydrostatic radial bearing located on a side of said acting points of the resultant force of mean hydraulic reaction forces and beneath said x-axis and outside the shifting range of said acting point of said resultant force, a second hydrostatic radial bearing located on a side away from said acting point of said resultant force of mean hydraulic reaction forces relative to said y-axis and on a lower side of said x-axis, a third hydrostatic radial bearing located on a side away from said acting point of said resultant force of mean hydraulic reaction forces and on or in a vicinity of said x-axis, and a fourth hydrostatic radial bearing located above said x-axis and on or in a vicinity of said y-axis.

6. A bent axis type variable displacement hydraulic machine as defined in claim 5, wherein said drive disc is formed in a circular disc-like shape for tiltably supporting said pistons, and said hydrostatic radial bearing is provided between the outer periphery of said drive disc and the inner periphery of said casing.

7. A bent axis type variable displacement hydraulic machine as defined in claim 8, wherein said first and second hydrostatic radial bearings are located in positions satisfying the following equation:

$$f_{LY} \times e_L = f_{RY} \times e_R,$$

where:
$e_L$ = a distance along said x-axis spacing apart the center of sliding movement of said hydrostatic pad of said first hydrostatic radial bearing and said acting point of the resultant force of mean hydraulic reaction forces,
$f_{LY}$ = load components acting on the hydrostatic pad of said first bearing in the y-axis direction,
$e_R$ = a distance along said x-axis spacing apart the center of sliding movement of said hydrostatic pad of said second hydrostatic radial bearing and said acting point of said resultant force of mean hydraulic reaction forces, and
$f_{RY}$ = a load component acting on the hydrostatic pad of said second bearing in the Y-axis direction.

8. A bent axis type variable displacement hydraulic machine as defined in claim 7, wherein said drive disc is formed in a circular disc-like shape for tiltably supporting said pistons, and said hydrostatic radial bearing is provided between an outer periphery of said drive disc and an inner periphery of said casing.

9. A bent axis type variable displacement hydraulic machine comprising:
a cylindrical casing having a head casing with suction and discharge passages;
a shaft rotatably mounted in the casing and having a drive disc at an inner distal end thereof received in said casing;
a cylinder block located in said casing and having a plurality of axially extending cylindrical bores;
a plurality of pistons respectively reciprocally received in said cylindrical bores, each of said pistons being pivotally supported at one end by said drive shaft;
a valve plate having a pair of suction and discharge ports and having one end facing in sliding contact with said cylinder block and an opposite end face tiltably in sliding contact with a tilting sliding surface on said head casing;
a tilting mechanism for tilting said valve plate together with said cylinder block;
a hydrostatic radial bearing provided between said drive disc and casing for supporting radial loads of hydraulic reaction forces acting on said drive disc in radial and thrust directions as a result of operation of said pistons;
oil passages for conducting oil pressure to and from said hydrostatic radial bearing through one of said paired suction and discharge ports whichever is on the high pressure side, and
wherein, relative to the x- and y-axes, said hydraulic radial bearing includes a first hydrostatic radial bearing located beneath said x-axis and on a side of said acting point of the resultant force of mean hydraulic reaction forces in a position coinciding with said acting point of said resultant force in a distance along said x-axis, a second hydrostatic radial bearing located on a side away from said acting point of the resultant force of mean hydraulic reaction forces and on or in a vicinity of said x-axis, and a third hydrostatic radial bearing located on a side of said acting point of the resultant force of mean hydraulic reaction forces and in a position of point symmetry with said first hydrostatic radial bearing relative to said x-axis.

10. A bent axis type variable displacement hydraulic machine according to claim 9, wherein said drive disc is formed in a circular disc-like shape for tiltably supporting said pistons, and said hydrostatic radial bearing is provided between an outer periphery of said drive disc and an inner periphery of said casing.

11. A bent axis type variable displacement hydraulic machine as defined in one of claim 1, 6 or 10, wherein said hydraulic machine is one of a pump of main hydraulic pressure source and a drive motor in a hydraulic system of a construction machine.

* * * * *